United States Patent
Li et al.

(10) Patent No.: US 10,467,220 B2
(45) Date of Patent: Nov. 5, 2019

(54) SYSTEM AND METHOD FOR GENERATING AN EFFECTIVE TEST DATA SET FOR TESTING BIG DATA APPLICATIONS

(71) Applicant: Medidata Solutions, Inc., New York, NY (US)

(72) Inventors: Nan Li, Highland Park, NJ (US); Anthony Escalona, Queens, NY (US)

(73) Assignee: Medidata Solutions, Inc., New York, NY (US)

( * ) Notice: Subject to any disclaimer, the term of this patent is extended or adjusted under 35 U.S.C. 154(b) by 562 days.

(21) Appl. No.: 15/010,805

(22) Filed: Jan. 29, 2016

(65) Prior Publication Data
US 2016/0246838 A1 Aug. 25, 2016

Related U.S. Application Data

(60) Provisional application No. 62/118,199, filed on Feb. 19, 2015, provisional application No. 62/146,563, filed on Apr. 13, 2015.

(51) Int. Cl.
*G06F 16/23* (2019.01)
*G06F 16/25* (2019.01)
*G06F 11/36* (2006.01)

(52) U.S. Cl.
CPC ...... *G06F 16/2365* (2019.01); *G06F 11/3672* (2013.01); *G06F 11/3676* (2013.01); *G06F 11/3684* (2013.01); *G06F 16/254* (2019.01)

(58) Field of Classification Search
CPC ......... G06F 17/30076; G06F 17/30908; G06F 17/30371; G06F 17/30563; G06F 11/3672;

(Continued)

(56) References Cited

U.S. PATENT DOCUMENTS

2008/0082968 A1 4/2008 Chang et al.
2008/0114801 A1 5/2008 Singh
(Continued)

FOREIGN PATENT DOCUMENTS

EP 2801938 A1 11/2014

OTHER PUBLICATIONS

Ammann, Paul & Offutt, Jeff, Introduction to Software Testing, Chapter 4, Input Space Partition Testing, 2008.
(Continued)

*Primary Examiner* — Robert W Beausoliel, Jr.
*Assistant Examiner* — Pedro J Santos
(74) *Attorney, Agent, or Firm* — Steptoe & Johnson LLP; Robert Greenfeld

(57) ABSTRACT

A system for generating an effective test data set for testing big data applications includes a data collector, a data analyzer, an input domain modeler, a self-adaptive input domain modeler, and a test data set generator. The data collector collects a high volume of data from an original data set and initial constraints, the data analyzer analyzes the data and the initial constraints to generate analytical results, the input domain modeler automatically generates an input domain model based on the analytical results, the self-adaptive input domain modeler generates a self-adaptive input domain model by combining the input domain model and analytical results, and the test data set generator generates an initial test data set based on the self-adaptive input domain model. A method for generating an effective test data set for testing big data applications is also described.

10 Claims, 5 Drawing Sheets

(58) Field of Classification Search
CPC ............. G06F 11/3676; G06F 16/2365; G06F 16/254; G06F 11/3684
USPC .......................... 707/694, 803, 809; 706/12
See application file for complete search history.

(56) References Cited

U.S. PATENT DOCUMENTS

| | | | |
|---|---|---|---|
| 2009/0024551 A1* | 1/2009 | Agrawal | G06F 17/30371 706/47 |
| 2012/0191631 A1* | 7/2012 | Breckenridge | G06N 99/005 706/12 |
| 2012/0284212 A1* | 11/2012 | Lin | G06N 99/005 706/12 |
| 2012/0284213 A1* | 11/2012 | Lin | G06N 99/005 706/12 |
| 2013/0006623 A1* | 1/2013 | Chelba | G10L 15/187 704/233 |
| 2014/0173618 A1 | 6/2014 | Neuman et al. | |
| 2014/0180982 A1 | 6/2014 | Murphy et al. | |
| 2014/0207784 A1 | 7/2014 | Carasso et al. | |
| 2014/0372346 A1 | 12/2014 | Phillipps et al. | |

OTHER PUBLICATIONS

Li, Nan, Escalona, Anthony, Guo, Yun, and Offutt, Jeff, A Scalable Big Data Test Framework, 2015 IEEE 8th International Conference on Software Testing, Verification and Validation (ICST), Apr. 2015.
The International Search Report and the Written Opinion of the International Searching Authority, PCT/US2016/017981, dated Jun. 21, 2016.
Alexandrov, Alexander, et al., "Issues in Big Data Testing and Benchmarking," in Proceedings of the Sixth International Workshop on Testing Database Systems, DBTest '13, Jun. 24, 2013, pp. 1-5 (Ass'n for Computing Machinery (ACM), New York, NY).
Ammann, Paul and J., Offutt "Chapter 4: Input Space Partitioning," in Introduction to Software Testing, Cambridge University Press, pp. 150-169 (2008).
Fredlund, Lars-Åke, et al., "Property-based Testing of JSON based Web Services," 2014 IEEE International Conference on Web Services, IEEE, Jun. 27, 2014, pp. 704-707.
The Extended European Search Report of the European Patent Office, EP App. No. EP16752873, dated Aug. 29, 2018.

* cited by examiner

US 10,467,220 B2

SYSTEM AND METHOD FOR GENERATING AN EFFECTIVE TEST DATA SET FOR TESTING BIG DATA APPLICATIONS

CLAIM OF PRIORITY

This application claims priority from U.S. Provisional Application No. 62/118,199, filed on Feb. 19, 2015, and U.S. Provisional Application No. 62/146,563, filed on Apr. 13, 2015, both of which are incorporated by reference in their entirety.

BACKGROUND

Big data applications that use "cloud"-based techniques to process and store data may process data on the order of hundreds of gigabytes to terabytes or petabytes. For example, extract, transform, and load ("ETL") applications may use Hadoop MapReduce (an Apache open source framework) to process big data sets over a cluster of computers using the Hadoop Distributed File System ("HDFS"). Software developers may write Hive or Pig scripts for reporting and analytics purposes. Apache Hive and Pig scripts may be transformed to MapReduce programs, on top of Hadoop. Validating such big data applications in agile development processes may entail using test data sets derived from big data sources. These test data sets may be generated manually by, e.g., project managers, architects, developers, and testers, or by using random test data generation tools, but the test data sets may not provide effective coverage or include quality test data.

Figure 1:
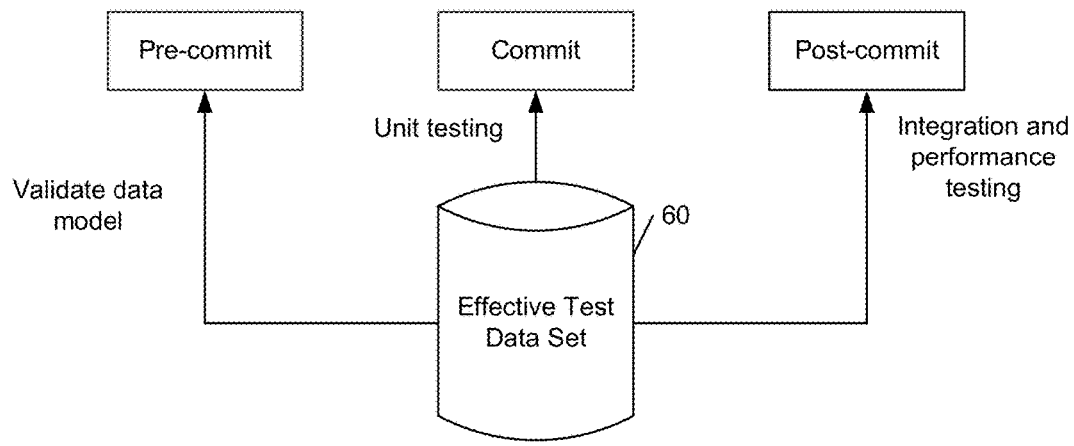
FIG. 1 is a block diagram showing how an effective test data set generated by a Big Data Test Data Set Generator may be used in software development life cycles, according to an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, and components have not been described in detail so as not to obscure the present invention.

In typically traditional ETL applications, data may be extracted from an original data source or data set (e.g., a MySQL database) and may be transformed into a proper (usually different) format for querying and analysis purposes. The transformed data may be loaded into a target source (e.g., a PostgreSQL database) for customers to view. In the context of clinical trials, high volumes of clinical trial data may be computed, stored, and analyzed using Amazon Web Services (AWS). Therefore, a Hadoop-based service such as Amazon Elastic MapReduce ("EMR," see http://aws.amazon.com/elasticmapreduce) may be used to process data, which may include clinical trial data, and hundreds of gigabytes to terabytes or petabytes of data may be processed faster than can be processed without EMR. Data storage infrastructures in the "cloud" may include Amazon Simple Storage Service ("S3") and Redshift. S3 may provide data storage infrastructure in the cloud, and Redshift may provide a data warehouse service. Specifically, using AWS technologies, an ETL application may obtain source data from S3 or a relational database, may process the data on EMR clusters, and may save the transformed data on S3 or Redshift.

However, even with EMR, a problem in testing big data applications is that processing high volumes of data takes a long time. In the clinical trial context, there are large amounts of data from various clinical trial sites, studies, subjects, and Internet of Things ("IoT"), such as Vital Connect and Actigraph applications from different clients. (The Internet of Things interconnects embedded devices on the Internet.) Thus, even with EMR, processing terabytes of data may take days or weeks. And with IoT, the amount of data to process continues to grow. Processing an entire historical database, or even a partial database from an original source hinders an overall agile software development process.

It is desired to find a small, effective, and meaningful (referred to herein as "effective") test data set that can be used in the agile development process to obtain quick feedback. To find potential faults, this data set should cover different test scenarios, for at least two reasons. First, the data set should satisfy various constraints. For instance, if data are generated for relational databases, constraints such as foreign key constraints and unique key constraints have to be satisfied. Second, the data set uses real data from the original data source. Real data are easy to understand, more easily allow test oracles to be derived that determine whether tests pass, and are what customers want to use for testing. Useful information from the original data source should be analyzed and extracted to determine which of the real data should be included in the effective test data set. This use of real data differs from previous research that generated synthetic data.

There are four challenges in generating an effective test data set. First, the data comes in various types. Data may come from databases, flat (text) files such as JSON (http://www.json.org), videos, and other formats. This patent specification uses data generation for databases and uses databases as a non-limiting example to explain how to generate an effective test data set. Second, high volumes of data are used to generate an effective test data set, so it is a challenge to determine which coverage to use to measure the effectiveness of the test data set. Third, it is a challenge to satisfy constraints: the effective test data set should satisfy constraints from the database and testers may derive more constraints from requirements, and these constraints also should be satisfied. One way to approach this challenge is to write constraints in a declarative way so that they are easy to specify, such that testers can understand and update constraints when requirements change. Fourth, it is a challenge to generate effective test data sets quickly to reflect dynamically changing data and constraints. If data or constraints are changed, it may not be desirable to process the original data source again because processing the original data source may take a long time.

Regarding these challenges, generating a small test data set selected randomly from an original large data source may be the simplest method. However, this method does not analyze various constraints, which impact negatively upon test data set effectiveness, and does not cover various test scenarios. Generating test data sets manually makes it difficult to maintain the test data sets when new data comes in or constraints are changed.

Input space partition testing has been used to generate a small test data set from all possible combinations of test values from input domains (see, e.g., P. Ammann and J. Offutt, *Introduction to Software Testing*, Cambridge University Press, 2008 (Cambridge, UK)). The core technique creates input domain models (IDMs) by finding input domains, creating partitions to divide each domain into blocks, and applying combinatorial coverage criteria to the blocks of each input. Input space partition testing does generate small and effective test data sets from high volumes of data, but existing input space partition testing techniques create IDMs manually without analyzing the original data source, which is not desirable.

To also address the challenges, the inventors automate the creation of a partition by processing and analyzing high volumes of data and various constraints. All constraints are written in a JSON format that is easy for testers to specify and for computers to understand, as will be discussed below. Furthermore, the inventors develop a self-adaptive data generation approach that expands the traditional IDM to a Self-Adaptive Input Domain Model ("SAIDM"). Such an SAIDM includes not only an IDM but also analytical results for the constraints and the original data source. Therefore, when new data come in and constraints are modified, the SAIDMs are updated accordingly to reflect the changes. Because the historical data are processed only once and test data sets are generated from the SAIDMs, the test generation is fairly rapid, without hindering the big data application development in agile development processes. A Big Data Test Data Set Generator is described below to address these challenges.

FIG. 1 is a block diagram showing how an effective test data set 60 generated by the Big Data Test Data Set Generator may be used in software development life cycles. Agile software development may consist of many cycles, each of which has three phases: pre-commit, commit, and post-commit. The pre-commit phase is usually the design stage. At this phase, product staff and architects may discuss the design of the software product and may design the schema of databases and associated data structures. The Big Data Test Data Set Generator can generate a test data set against the database schema and validate the schema. In doing so, faults in the schema may be found at an early stage. During the commit phase, developers may write code and perform unit tests. After the development is finished, during the post-commit phase, testers may perform integration and performance testing. "Integration testing" may include integration testing, component testing, system testing, and user acceptance testing, as those terms are used in academia. In industry, many people refer to "integration testing" as all levels of functional testing beyond unit testing (lowest level). The Big Data Test Data Set Generator may generate different test data sets for the commit and post-commit stages for unit, integration, and performance testing, according to the various requirements in different phases.

One prior art approach uses Pig scripts/Structured Query Language (SQL) queries to develop effective test data sets. But that approach did not properly account for constraints. In contrast, the approach developed herein derives various constraints from the original data source and requirements provided by stakeholders and architects. Using combinatorial coverage and the inventors' self-adaptive approach can generate an effective and comprehensive test data set dynamically with changing data and constraints. Another prior art approach has been used to generate a large test data set, but that has generated a synthetic data set. In contrast, the inventors' approach can use real data from the original data source and find faults in programs.

Input space partition testing has also been used, but not in the big data context. The present invention introduces a novel, automated, self-adaptive test generation strategy to apply input space partition testing to the large volumes of data involved in big data, as will be described below. Additionally, the system of the present invention may use constraints (e.g., logic, statistics-based, and foreign key constraints) derived from business requirements, which may include complex relationships among data fields, to generate the test data. Users can easily generate scalable test data sets (in different sizes) when users provide constraints in configuration files for all levels of testing including unit, integration, and performance testing. As such, the generated effective test data set may include only a fraction of the original data set, while satisfying the complicated constraints and improving coverage over that of the prior art.

Thus, in the present invention, input space partition testing may be used to generate a small set of test inputs by creating IDMs, which may include partitioning the domains of related parameters, selecting test values from partitioned blocks, and applying combinatorial coverage criteria. The first step of using input space partition testing to create IDMs and generate tests is to find all inputs for which test values should be generated. For example, test data sets may be generated for a database table called "Studies." To keep the example simple, only two columns in this table are considered: ProjectID ($-2^{31}$, 0, 1, 2, 3, ..., $2^{31}-1$) and StudyActive (1 and 0). The columns are treated as input parameters for input space partition testing. The ProjectID column shows which project to which a study belongs and the StudyActive shows whether the study is active. Next, a characteristic for each input may be selected. A characteristic is a rule that defines how to partition an input domain. Thus, a characteristic may be used to create a partition over an input domain. A partition may define a set of blocks (b1, b2, b3, . . . , bn) for the domain of an input parameter. The partition may satisfy two properties: blocks may be pairwise disjoint, such that there is no overlap; and together, the blocks may cover the domain. The system may select one value from each block. For example, the characteristic for the input parameter ProjectID may be finding edge cases of the IDs (integer data type). The edge cases of an integer are defined to be the minimum value of the integer, 0, and the maximum value of the integer. Then the partitioned blocks are $2^{31}$, $(-2^{31}, 0]$, $(0, 2^{31}-1]$. Similarly, the characteristic for the input parameter StudyActive may be whether a study is active. Then the input domain is partitioned into two blocks: 1 (active) and 0 (inactive).

Once partitions are created over the input domains, test values may be selected from the partitioned blocks for each input. For instance, for the input ProjectID, $-2^{31}$ may be selected from the $-2^{31}$ block since this block has only one value, 0 may be selected from the $(-2^{31}, 0]$ block, and $2^{31}-1$ can be selected from the $(0, 2^{31}-1]$ block. For the input StudyActive, "1" may be selected from the active block and "0" from the inactive block. Thus, test values "1" and "0" are selected for the StudyActive input, and $-2^{31}$, 0, and $2^{31}-1$ are selected for the ProjectID input. Note that methods other than random selection could be used to select test values from the partitions. Additionally, statistics may be used to determine which values should be selected. For instance, the median of the values in one partition or the value that appears the most times (i.e., the mode) in the original data source may be selected if the value is important to users. If a statistics-based constraint specifies extracting the most and least counted test values form the original data source, additional values such as 2 and 20 may be selected. Then $-2^{31}$, 0, 2, 20, and $2^{31}-1$ are used for the ProjectID column.

Next, a test data set for a table may be generated from the selected test values. A test data set for a table is a set of rows and each row includes single test value for each column (input parameter). Here various combinatorial coverage criteria may be used to generate test data sets. If the "all-combinations" coverage criterion is used, the number of test data sets is the product of the number of blocks and number of inputs (characteristics). For this scenario, the number of test data sets is 2*5=10: "1" may be combined with any of $(-2^{31}, 0, 2, 20,$ and $2^{31}-1)$, and "0" may be combined with any of $(-2^{31}, 0, 2, 20,$ and $2^{31}-1)$. Then the ten test data sets are $[-2^{31}, 1]$, $[20, 1]$, $[0, 1]$, $[2, 1]$, $[2^{31}-1, 1]$, $[-2^{31}, 0]$, $[20, 0]$, $[0, 0]$, $[2, 0]$, and $[2^{31}-1, 0]$. Because using all combinations may result in too many test data sets, another coverage criterion, such as the "each choice" coverage criterion, may be used. This is where one value from each block for each characteristic is used in at least one test data set. (The each choice coverage criterion is described in more detail below.) The number of test data sets is the number of blocks in the largest characteristic and is much less than the number of all combinations. For this example, the largest characteristic is the characteristic used for the input ProjectID, since it has five blocks. A test data set may look like $[-2^{31}, 0]$, $[20, 1]$, $[0, 0]$, $[2, 0]$, and $[2^{31}-1, 1]$. Instead of generating ten test data sets by using the all-combinations coverage criterion, just five test data sets may be generated by using the each choice coverage criterion.

In the prior art, input space partition testing was used to generate a data set for testing database-based applications. This invention differs in several respects. First, the program subjects are different. The prior art studied normal programs such as Java programs that use Structured Query Languages (SQLs), while this invention is applied to big data applications such as Hive and Pig scripts. Second, the amount of data processed is much different. Databases were not very big in the past, while the amount of data now being processed is often measured in terabytes and petabytes. Therefore, the self-adaptive approach for generating test data sets keeps up with continuously growing amounts of data. Third, the prior art did not analyze the original data source but generated synthetic data, whereas the present invention uses real data from the original source. Fourth, the prior art generated IDMs manually, using heuristics as characteristics to determine which test values to select for IDMs. In the present invention, important values are derived automatically from various constraints and the original data source, and these derived values are used to generate the IDMs. In summary, the big data self-adaptive approach allows the generation of a real data set quickly and automatically while data and constraints may be changing.

Figure 2A:
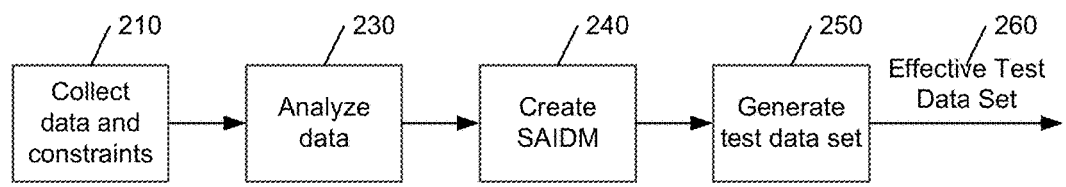
FIG. 2A is a flowchart showing an initial cycle in a process for generating an initial effective test data set, according to an embodiment of the present invention.
Figure 2B:
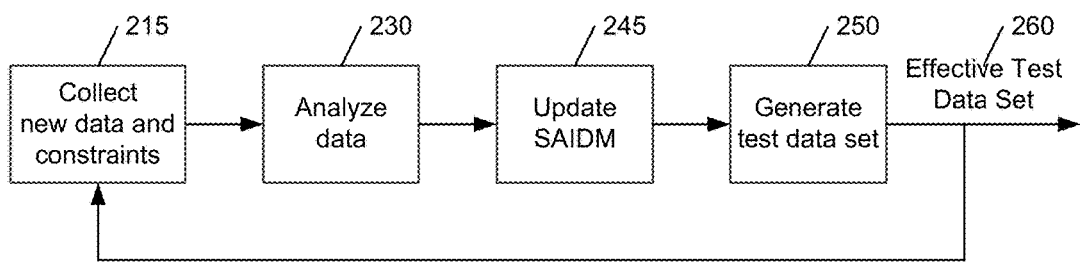
FIG. 2B is a flowchart showing subsequent cycles in a process for generating subsequent effective test data sets, according to an embodiment of the present invention.

As stated above, the system of the present invention generates effective test data sets from high volumes of data, satisfying various constraints from an original data set or source, even with dynamically changing constraints and data. Applying combinatorial coverage from input space partition testing generates a small but effective test data set. In addition, a format is designed that defines various constraints so that testers may more easily specify the constraints and the system may more easily read and understand the constraints. A mechanism is developed to specify the constraints in a JSON format. To generate test data sets quickly, it is desirable to avoid taking time to process the original data set whenever data and constraints are changed, since processing high volumes of the original data set takes a long time. Instead, it is preferable to process only the new constraints and data, and compare them to the self-adaptive IDMs, which include important test values and the analytical results of various constraints from the original data set. After analyzing the new constraints and data, the system updates the self-adaptive IDMs dynamically and generates an effective test data set from the newly updated self-adaptive IDMs. The system includes a feedback loop, shown in FIGS. 2A-2B. The self-adaptive system has two phases: an initial cycle (FIG. 2A) and subsequent cycles (FIG. 2B). The initial cycle includes collecting data and constraints in operation 210, analyzing data in operation 230, creating one or more SAIDMs in operation 240, and generating an effective test data set in operation 250. Effective test data set 260 is then fed back in FIG. 2B and the subsequent cycles include collecting new data and constraints in operation 215 (if space allows), analyzing the new and old data, updating the SAIDMs in operation 245, and generating an effective test data set in operation 250.

Figure 3A:
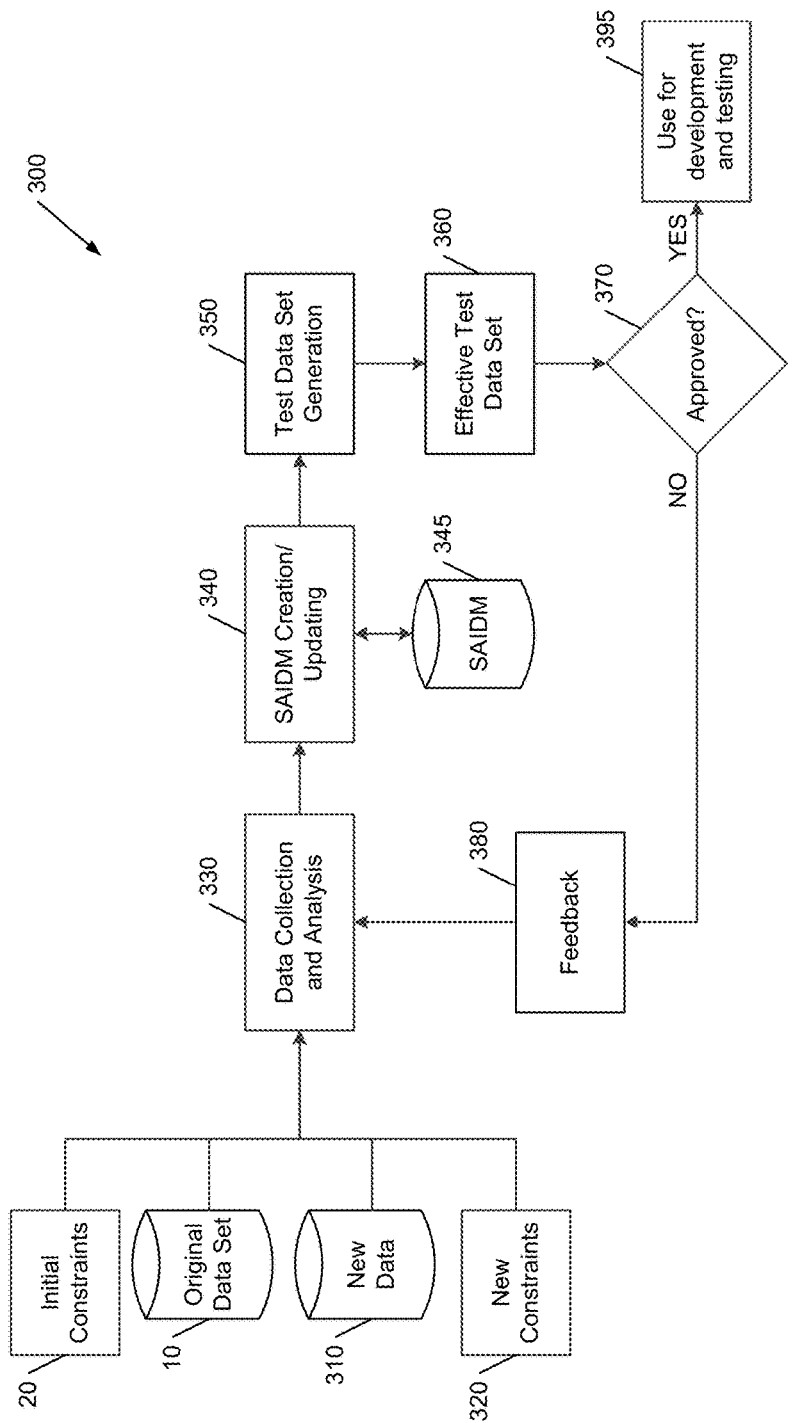
FIG. 3A is a block diagram illustrating an architecture of a Big Data Test Data Set Generator with feedback, according to an embodiment of the present invention.

FIG. 3A shows the overall architecture of the Big Data Test Data Set Generator system 300 with feedback. In the initial cycle, data collection and analysis module 330 collects and analyzes original data set (or source) 10 and initial constraints 20. The module saves analytical results such as (1) relationships among objects (tables) derived from constraints and (2) the statistical distribution of the original data. The system derives important values from analytical results of the constraints for every input to create one or more SAIDMs. Then SAIDM Creation/Updating module 340 creates one or more SAIDMs 345 by combining the SAIDMs and analytical results. An effective test data set 360 is generated from the SAIDMs via test data set generation module 350. In the second phase, data collection and analysis module 330 collects and analyzes new data 310, such as live streaming data (e.g., incremental daily data) and new or changing constraints 320. The SAIDMs are updated with the changes, and another effective test data set is generated from the updated SAIDMs. After each cycle, the effective test data set is reviewed by product managers, architects, developers, etc., in operation 370. If there is no negative feedback, this effective test data set will be used for development and testing in operation 395. Otherwise, system 300 collects the feedback 380 and uses it in the next cycle, and then applies machine-learning techniques to optimize SAIDMs and test generation strategies to generate better effective test data sets. Such machine-learning techniques may include decision-making-related machine-learning algorithms to choose better strategies for generating test data. For example, the Big Data Test Data Set Generator may generate a test data set A, and then the product managers, architects, developers, etc., review A, make several modifications, and return a test data set B to the Big Data Test Data Set Generator. The Big Data Test Data Set Generator is able to analyze the difference between A and B and determine which test generation strategy would generate test data included in B. By applying decision-making-related machine-learning algorithms, the Big Data Test Data Set Generator learns and uses a more optimized strategy for generating test data.

In more detail, in data collection and analysis module 330, each column of a database table may be considered to be an input. Historical data and initial constraints are collected in the initial cycle and live streaming data and changing constraints are collected in the following cycles. Various constraints and data may be collected and analyzed differently. Ten constraints are considered based on the inventors' industrial experience and the Applicant's needs and integration requirements when generating test data. Table 1 shows each constraint and the activities in which the constraint is involved in system 300. The constraints used in Create/Update activities are listed first.

TABLE 1

| Constraints | Activities |
|---|---|
| Foreign key constraint | Create, update, generate |
| Check constraint | Create, update |
| Default constraint | Create, update |
| Specific value constraint | Create, update |
| Logic constraint | Create, update, generate |
| Statistics-based constraint | Create, update |
| Density constraint | Generate |
| Unique key constraint | Generate |
| Combinatorial Coverage constraint | Generate |
| Test data set size constraint | Generate |

Unlike prior art that derives constraints from source code (which may interpret requirements incorrectly), constraints in this system are derived directly from requirements, which are provided by product managers and architects. It is desirable that testers get independent requirements and avoid misinterpretation by developers. Some of the constraints are provided manually, while others, such as foreign key, unique key, check, and default constraints, can be automatically extracted from database schema. If any constraint is missing in the database schema, a user may provide it. Each constraint is collected and analyzed; however, it is desirable for constraints to be written in a format so that people and the system can easily understand and clearly specify various constraints. In this specification, JSON is used as the basic format and additional properties are developed for each constraint. Constraints are specified in one file for each table. Below will be described how each constraint is defined and specified and how to collect and analyze data with the constraints.

Constraints may be used to measure the effectiveness of generated test data sets in two aspects: the number of constraints and strength of constraints. A test data set A may be considered more effective than another test data set B when the constraints satisfied by A, constraints_A, include all of the constraints satisfied by B, constraints_B, and each of constraints_A is at least as strong as the corresponding constraint in constraints_B. A first constraint may be considered stronger than a second constraint when the first constraint can generate more test values than the second constraint. For example, a specific value constraint that specifies two values (0 and 1) is stronger than another specific value constraint that specifies one value (0). A combinatorial coverage constraint that generates 100 combinations of test values is stronger than another combinatorial coverage constraint that generates 10 combinations of test values. A test data set may be considered effective enough when the number of constraints satisfied by the test data set is at or above a certain level or percentage of constraints, the strength of the satisfied constraints is the same as or greater than a certain level or percentage of its maximum strength (e.g., test values generated), or both.

As a simplified example, this specification will use database tables to explain how the Big Data Test Data Set Generator works. In the following tables, the names of the first row in each table represent the column names. The first column shows the row number; the next column is the primary key for each table. The rows that start with numbers represent the data stored in the tables. Each table may have hundreds or thousands of rows.

PROJECTS TABLE

| Row # | ProjectID | ProjectName | ProjectActive | Created | Updated |
|---|---|---|---|---|---|
| 1 | 1 | Project1 | 1 | 2010-01-01 | 2015-12-10 |
| 2 | 2 | Project2 | 0 | 2008-01-09 | 2011-01-28 |
| 3 | 3 | Project3 | 1 | 2000-09-01 | 2016-01-13 |

STUDIES TABLE

| Row # | StudyID | "ProjectID" | "StudyActive" | Deleted | Created | Updated | External SystemID |
|---|---|---|---|---|---|---|---|
| 1 | 1 | $-2^{31}$ | 0 | 0 | 2010-01-09 | 2014-12-12 | $-2^{31}$ |
| 2 | 2 | 20 | 1 | 0 | null | null | 0 |
| 3 | 3 | 0 | 0 | 0 | " | 2014-12-12 | 10 |
| 4 | 4 | 2 | 0 | 0 | 2011-01-19 | " | 111 |
| 5 | 5 | $2^{31} - 1$ | 1 | 0 | 2011-01-19 | 2015-12-10 | $2^{31} - 1$ |

EXTERNALSYSTEMS TABLE

| Row # | ExternalSystemID | ExternalSystemName | ... |
|---|---|---|---|
| 1 | 111 | System111 | |
| 2 | 222 | System222 | |
| 3 | 333 | System333 | |

To expand the example test data set in the previous paragraphs, the test data sets for the Studies table may include test values for every column, not just the two columns ProjectID and StudyActive. The complete test data sets (StudyID, "ProjectID", "StudyActive", Deleted, Created, Updated, ExternalSystemID) for the Studies table may look like [1, "$-2^{31}$", "0", 0, 2010-01-09, 2014-12-12, $-2^{31}$]. [2, "20", "1", 0, null, null, 0], [3, "0", "0", 0, " ", 2014 Dec. 12, 10], [4, "2", "0", 0, 2011-01-19, " ", 111], and [5, "$2^{31}-1$", "1", 0, 2011-01-19, 2015-12-10, $2^{31}-1$]. The test values in quotation marks (except for the empty entries denoted " ") match the test data sets generated using the each choice coverage criterion in the previous example. Similarly, the test data sets for any table could have multiple rows like what is shown for the Studies table. In this way, test data sets for the Projects and ExternalSystems tables will be generated. A test data test for the whole database will include the test data sets for all the tables including the three tables above.

A foreign key constraint defines referential relationships among database tables. Foreign key constraints are automatically extracted from databases or are provided manually in JSON configuration files. For example, a project may have multiple studies in clinical trial research. A Studies table (whose configuration file is shown below) may have a ProjectID column, which refers to the primary key ProjectID of the Projects table. If this information is not missing from the database (sometimes foreign key constraints are not added to the database due to performance issues), this relationship can be specified in the example below. If there are multiple missing foreign key constraints, each of them may be specified in the array of columns. Once all the foreign key constraints are collected, the system analyzes them to determine the ordering of tables for generating test values, generating an ordered table sequence. This ordered table sequence includes tables that do not have dependencies (either no foreign key constraints or referred tables have been generated) first, followed by the tables that have dependencies. Test data for tables are generated using this ordered table sequence:

```
columns:
[{
"columnName": "ProjectID",
"isForeignKey": true,
"referredTableName": "Projects",
"referredColumnName": "ProjectID"
}]
```

A check constraint is a logical expression specified in database schema, such as 18≤age≤70 for a column. Each value to insert into the column has to satisfy this expression. A default constraint presents a default value to be inserted if no values are explicitly specified. Specific value constraints specify required special values to include in test data sets. For instance, zero, the min integer, and the max integers may be specified for an integer data type. Nulls and empty strings may be specified for a string data type. Different Unicode characters may also be specified, such as Chinese characters.

Check and default constraints may be automatically extracted from database schemas. Then the system may update the domain of inputs on which the check constraints are imposed. For example, the initial domain of the employee age column is from the min integer to the max integer. After the analysis of the check constraint above, the domain becomes 18≤age≤70 since any value outside of this range is rejected by the database. Regarding default constraints, the system extracts default test values as important values for the SAIDM creation step. Testers may specify particular value constraints for each column in configuration files. The format is specified below. Like values derived from check and default constraints, the specific values will be used for creating SAIDMs.

```
columns:
[{
"specificValues": "specficValue1", "specificValue2", etc.
}]
```

A logic constraint is an additional logical expression extracted from requirements about SQL join conditions. Testers may provide logic constraints in the JSON configuration files. The test values that evaluate these logical expressions to be true have to be included in the effective test data set so that the join conditions are satisfied. In addition, logical coverage criteria such as Predicate Coverage and Clause Coverage could be used to generate more test values. Predicate Coverage requires a test data set to evaluate the predicate to be true or false. Clause Coverage requires a test data set to evaluate every clause to be true or false. A logic constraint example for the Studies table is shown in the JSON structure below. This example shows that the effective test data set has to include studies that are active and have not been deleted. The "genType" attribute specifies that the effective test data set should satisfy Predicate Coverage. Some business requirements can be included as logic constraints, such as when column1 is A and column2 has to be B.

```
logicConstraints:
[{
"expression": "Deleted = 0 && StudyActive = 1",
"genType": "Predicate"
}]
```

A statistics-based constraint specifies important test values for creating partitions based on statistical analysis. The system collects the original data set and calculates its statistical distribution. If the original data set is very large, the system may collect part of the original data set, perhaps 10% randomly. One strategy counts the numbers of appearances (frequency) of distinct test values for each input. For example, a statistics-based constraint may specify that the most counted and least counted test values are to be selected. Another strategy may select the newest and oldest values. The selected test values will then be used as important values for creating IDMs. Advanced statistics techniques such as cluster and multivariate analysis may also be used. Values from both clusters and outliers should be selected.

A density constraint may apply when tables have foreign key constraints. If the Studies table (having a primary key StudyID) has a ProjectID column, which refers to the primary key ProjectID of the Projects table, semantically a project could have one or more studies. If each project has only a few studies, the density is low. If each project has thousands studies or even more, the density is relatively high. The density constraint is also called "multi-children parent relationship" and can be used for performance testing. In the example below, the child column is StudyID and the parent column is ProjectID. The example below shows a density constraint in a JSON structure. The "children" attribute is the children column IDs (the primary key). The "parents" attribute shows the columns that have foreign key constraints. The "maxChildren" attribute gives the maximal number of children included by each parent instance. One strategy is to generate one parent instance with the maximum number of children and other parent instances containing random numbers of children between one to the max number. The "numParentInstances" attribute presents the number of parent instances to which density constraints are applied. All combinations of parent instances from each column are calculated. If this number is negative one, then all combinations are used. If the number is positive and less than the total number of all combinations of parent instances (note that the parent instances have been selected from the referred table), the system returns that number of parent instances randomly.

```
densityConstraints:
[{
"children": "StudyID",
"parents": "ProjectID",
"maxChildren": 5,
"numParentInstances": 3
}]
```

A user may specify combinatorial coverage for additional columns, besides the density constraints and logic constraints. The example below shows the application of each choice coverage to the columns Created and Updated. Each choice coverage requires each value from each block for each characteristic of IDMs to appear at least once in the test data. A user may also specify All Combinations coverage, which requires all combinations of blocks from all characteristics.

```
combCovConstraints:
[{
"columns": "Created, Updated",
"covType": "EachChoice"
}]
```

Now in more detail is described the creation of self-adaptive IDMs. An SAIDM consists of two major parts: IDMs and analytical results of constraints. IDMs are created for each input based on characteristics. In this specification, a consistent characteristic for creating IDMs is used for each column of each table: using test values extracted from each constraint to create partitions. As described above, the original data set is collected and analyzed with the constraints. Then important test values are derived from check constraints, default constraints, specific value constraints, logic constraints, and statistics-based constraints for each column of the tables. These important extracted test values are used to create partitions for each input (column). If an input domain is numeric, such as Integer, the range from the smallest of the extracted test values to the minimum integer forms a block, and the range of the second smallest of the extracted test values to the smallest forms another block. If an input domain is non-numeric, such as String, each distinct test value is a block and the rest of the domain is another block. For example, the data type of a column called "Age" is Integer. If zero, the minimum integer, and the maximum integer are extracted from various constraints, the integer domain for the Age column is divided into three blocks: [min], (min, 0], and (0, max]. If a statistics-based constraint is specified, the age of most employees is between 22 and 60. Then (0, max] is further divided into (0, 22], (22, 60], and (60, max]. A different mechanism could be used to create partitions based on the extracted test values. For example, the following partition may be created: [min], (min, 0), [0], (0, max), and [max], given the min, 0, and the max. A user may be given options to create various partitions in the system. If the data type of a column (e.g., employee role) is String and the derived test values are "manager," "engineer," and "director," then these three values are three blocks and other string values form another block.

IDMs are created based on the constraints collected and analyzed. Thus, the system may also maintain a data structure for saving the analytical results of constraints in the SAIDMs.

After SAIDMs are created they may be updated. If data are changed, the rows from these new data may be randomly selected using the same percentage (e.g., 10%) used to extract data from the original data set. Then the selected rows from the new data are merged into the existing extracted data from the first phase (initial cycle), updating the statistics of the totally selected data, such as value frequencies, in the SAIDMs. The update based on the extracted data affects the statistics-based constraints and different values may be derived. For example, if the value that has highest frequency for a column is changed and the most and least frequently appearing values are selected, the selected test values would change. Furthermore, the partitions of the IDMs will change accordingly.

In one embodiment, new data may be input continuously from various portals such as desktops and mobile devices. These data may be stored in a temporary location (e.g., Amazon Kinesis, which is a data streaming service that stores data temporarily for 24 hours), and then the data may be pushed to another form of storage such as a database. Thus, the system may process new data periodically every 24 hours. Check and default constraints are unlikely to change because they are defined in the database schema. Since the constraints and their analytical results are saved in the SAIDMs, the derivation of new test values for each constraint occurs fairly quickly. Once the new test values are derived for every constraint, the partitions of the IDMs are updated.

The last activity in FIG. 3A to be described in detail is test data set generation 350. After the collection, analysis, and SAIDM creation activities, necessary constraint information has been parsed and SAIDMs have been created. As shown in Table 1, foreign key, logic, density, unique key, combinatorial coverage, and test data set size constraints may be considered, as described below, when generating effective test data set 360. Other constraints are needed only in the previous activities.

First, foreign key constraints are considered. The current row number for a table is set to maximum integer. The ordered table sequence is re-used from previous analytical results. Test data sets for the table are initially generated without foreign key constraints or dependencies. Second, for the table, test values are generated for density constraints, but generally only for primary key columns, referred to as "children" in density constraints. The number of rows is updated with the number of children. Other columns do not have test values yet. Third, test values are generated to satisfy logic constraints. The generated test values are assigned to the columns that have logic constraints. If the number of test data sets generated for the logic constraints is greater than the current number of rows, the extra test data sets beyond the number of rows will be truncated. A tester who wants to include all the test data sets can increase the number of children specified in density constraints. If there are no density constraints, number of rows is updated with the number of test data sets for the logic constraints. Fourth, test values for columns that have additional combinatorial coverage constraints are generated. Likewise, extra test data sets generated for combinatorial coverage constraints beyond the current number of rows are discarded; if density constraints exist, enough children may always be specified. Otherwise, the number of rows is updated with the number of test data sets for the combinatorial coverage constraints. When generating test data, unique key constraints are always checked for every column. No duplicated test values are used. Finally, if the test data set size constraints specify a larger number than the number of rows, additional rows are generated. For each extra row, test values from SAIDMs are selected for each column randomly.

Note that the effective test data set satisfies all constraints that the original data set may not satisfy. Thus, the effective test data set is likely to have better coverage than the original data set. Project managers, architects, developers, and testers review the generated, effective test data set. If any feedback is provided, the machine-readable feedback (e.g., a revised, effective test data set) will be collected and analyzed by the system in the next cycle. Machine-learning techniques (e.g., decision-making related algorithms) may be applied to the system to optimize the strategies of creating SAIDMs and generating effective test data sets by learning from the feedback.

Figure 4:
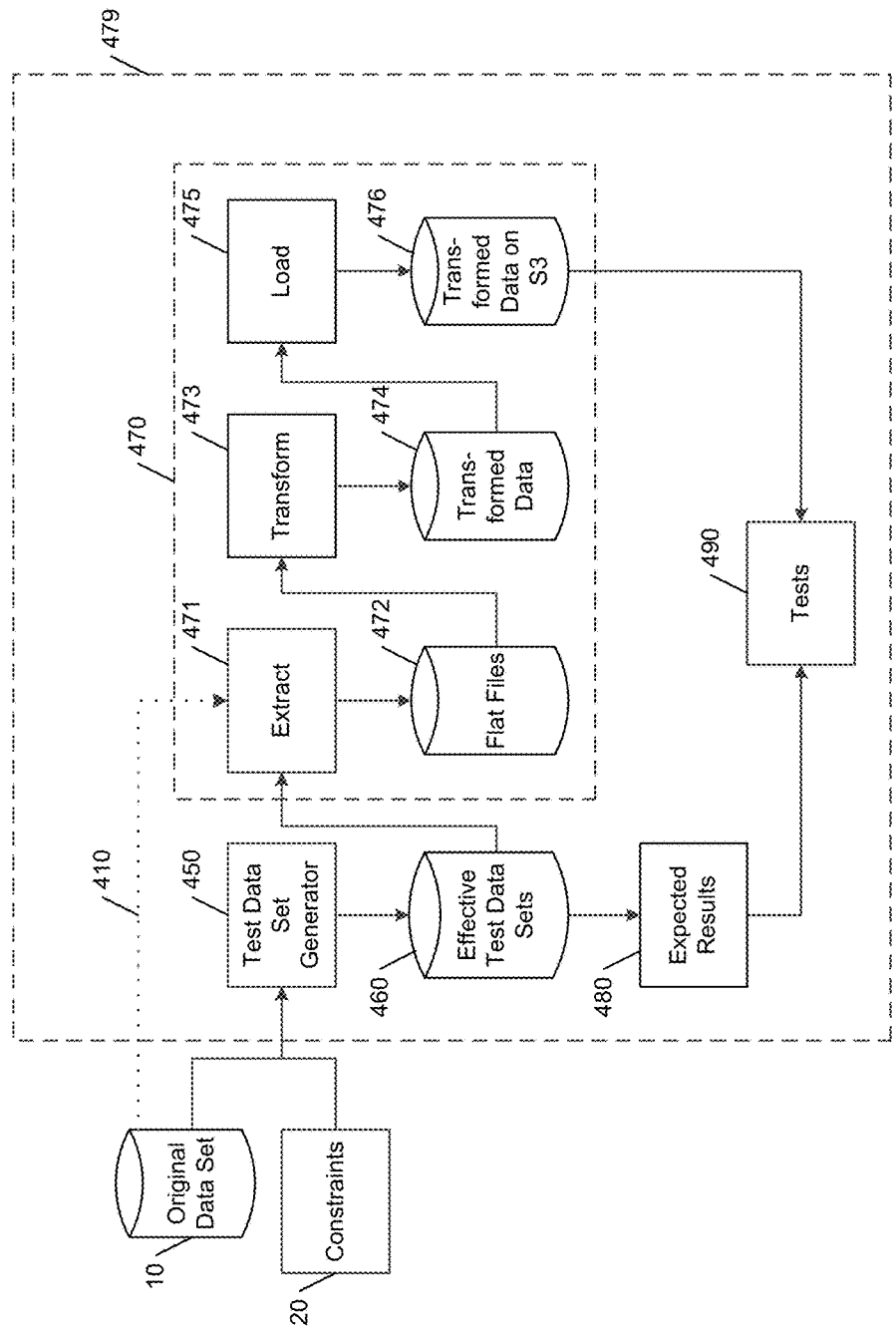
FIG. 4 is a block diagram of a system for using effective test data sets for testing big data applications, according to an embodiment of the present invention.

FIG. 4 is a block diagram of a system showing how to use effective test data sets for testing big data applications, according to an embodiment of the present invention. Given an original data set 10 (e.g., a relational database) and related constraints, the system may generate an effective test data set. In a real testing environment, this effective test data set may replace the original data set, which reduces testing time greatly. In FIG. 4, dotted line 410 from original data set 10 to ETL application under test 470 is the old data flow. Blocks 471, 473, and 475 represent three major activities of ETL application 470, Extract, Transform, and Load (known as ETL), and the respective results of each activity is shown in blocks 472, 474, and 476. In the old data flow, the original data set was used for testing, which could take days, weeks, or even longer if ETL application 470 is processing high volumes of data. During the agile development for 470, developers may make lots of code changes, and if ETL application 470 is tested using the original data set, the time taken will be unbearable. In the new data flow, the system reads original data set 10 and constraints 20, and generates using test data set generator 450 effective test data sets 460 (also called test generation databases). Running SQL queries against effective test data sets 460 yields expected results 480. Product staff and architects who have requirements knowledge typically write the SQL queries, which are treated as the correct solution in order to derive the expected results. Then ETL application under test 470 can use effective test data sets 460 as a source and perform the Extraction, Transformation, and Load processes. In a big data environment, the Extraction, Transformation, and Load processes are executed using big data tools and languages such as Pig scripts, but not SQL queries. These processes generate transformed data on S3 476, which are actual results. Finally, expected results 480 are compared in tests 490 against actual results 476 from ETL application 470. If expected results 480 are equal to actual results 476, then tests 490 pass; otherwise, tests 490 found faults in the ETL application under test 470 and testers and developers can diagnose the cause of the faults and fix them. In this embodiment, these testing processes, the test data generation, data extraction, data transformation, data load, and result evaluation, may be automated using an automation (continuous integration (CI)) tool, indicated by box 479, such as "Jenkins," which is a CI tool widely used in industry. Continuous integration is used in agile development processes, especially in industry. When developers finish a source code change and check in the change to a source code repository where source code is stored, such as Github, a CI tool can automatically pull the latest code change, build the source code, and run tests. Using CI tools may tighten the software development feedback loop. That all the processes are under "Jenkins" means that test data generation, test data process under the ETL application, and test execution are automated. The Big Data Test Data Set Generation approach can be seamlessly integrated with the best practices in industry without hindering continuous integration in agile development.

One way to generate an effective test data set is to start with original data set 10 as a Microsoft SQLServer database. This database may have many tables such as Projects, Studies, and ExternalSystems. A project may have multiple studies. The Studies table may have foreign key constraints that refer to the Projects and ExternalSystems tables. An example below will be used to show how various constraints for this table are specified, constraints are analyzed, SAIDMs are created, and an effective test data set is generated.

First, the data from the studies are processed and all constraints are collected. In this example, the Studies table has two foreign key constraints—"FK_Studies_ExternalSystems" and the "FK_Studies_Projects. "FK_Studies_ExternalSystems" refers to the ExternalSystemID column of the ExternalSystems table that is included in original data set 10. "FK_Studies_Projects" refers to the ProjectID column of the Projects table that is included in original data set 10. If the requirements specify that the test data do not need the ExternalSystems table, then the ExternalSystems table does not need to be included when analyzing the foreign key relationship among the tables and generating the ordered table sequence.

If the foreign key constraint to the Projects table from the Studies table is not included in the database schema, testers may need to add the foreign key constraint manually in a configuration file in JSON, as shown below. This JSON structure specifies that the ProjectID column of the Studies table is a foreign key constraint, referring to the ProjectID column of the Projects table. The "statisticsBasedStrategy" attribute specifies that when SAIDMs are created from the data for this column in the original data set 10, one most and one least frequently counted values are selected.

```
columns:
[{
"columnName": "ProjectID",
"isForeignKey": true,
"referredTableName": "Projects",
"referredColumnName": "ProjectID",
"statisticsBasedStrategy": MaxMin
}]
```

Check constraints and default constraints may automatically be extracted from original data set 10. For example, the default constraint ((0)) for the Deleted column may be collected and recorded in the SAIDMs. This constraint means that 0 is the default value for this column. 0 is equal to FALSE and means that a study is not deleted. Thus, 0 will be added to the SAIDM for this column as an important value.

The system automatically adds edge case values, such as the min and max integers, NULL, and empty strings, to the SAIDMs for every column by default. So in most cases, testers do not need to add special values.

Below, density, logic, and test data set size constraints are manually added to the configuration files based on the understanding of the requirements:

```
densityConstraints:
[{
"children": "StudyID",
"parents": "ProjectID",
"maxChildren": 5,
"numParentInstances": -1
}]
logicConstraints:
[{
"expression": "StudyID = 1 && StudyActive = 1 && Deleted = 0 && IsUserDeactivated = 0",
"genType": "Predicate"
}]
"rowNumberToGenerate": -1
```

The density constraint specifies that every parent instance has no more than five studies but has at least one study. Then the total number of rows of the Studies table will be between the number of parent IDs and five times the number of parent IDs. The logic constraint specifies the logic expression that has to be satisfied. So the study whose ID is equal to 1 also has to be active, has not been deleted, and has users activated. The "genType" attribute specifies that the system also needs to generate test values to satisfy the predicate coverage criterion. That means that the system generates test values that satisfy the predicate and do not satisfy the predicate.

After all the constraints are extracted and specified, the system processes data with the constraints and saves the analytical results in the SAIDMs. The system maintains a special data structure shown below:

```
Class Table {
String tableName;
List<Column> columns;
List<ForeignKeyConstraint> foreignKeys
List<CheckConstraint> checkConstraints;
Integer rowNumberToGenerate;
...
}
Class Column{
String columnName;
String dataType;
Boolean allowNull;
Boolean isPrimaryKey;
Boolean isForeignKey;
String defaultConstraintDef;
String checkConstraintDef;
List<ValueFrequency> valueFrequencies;
...
}
```

Based on the data structures, the constraints and analytical results are transformed into JSON files maintained as part of SAIDMs. For example, after processing the original data set 10, the JSON file for the Studies table looks like:

```
"tableName":"Studies","columns":[
{"columnName":"StudyID","dataType":"int","allowNull":false,"isPrimaryKey":true,"isForeignKey":false,"valueFrequencies":[{"value":"1","frequency":1}, ... ]},
{"columnName":"ProjectID","dataType":"int","allowNull":false,"isPrimaryKey":false,"isForeignKey":true,"valueFrequencies":[{"value":"1","frequency":1},
{"value":"2","frequency":1}, ..., {"value":"100","frequency":1}]},
{"columnName":"StudyActive","dataType":"bit","allowNull":false,"isPrimaryKey":false,"isForeignKey":false,"valueFrequencies":[{"value":"1","frequency":1710},
{"value":"0","frequency":2171}]},
{"columnName":"Deleted","dataType":"bit","allowNull":false,"isPrimaryKey":false,"isForeignKey":false,"valueFrequencies":[{"value":"0","frequency":1710},
{"value":"1","frequency":2171}]},
{"columnName":"Created","dataType":"date","allowNull":false,"isPrimaryKey":false,"isForeignKey":false,"valueFrequencies":[{"value":"2010-01-09","frequency":350}, {"value":"2010-02-19","frequency":230}, . . .,
{"value":"2011-01-19","frequency":1}]},
{"columnName":"Updated","dataType":"date","allowNull":false,"isPrimaryKey":false,"isForeignKey":false,"valueFrequencies":[{"value":"2014-12-12","frequency":50}, {"value":"2002-02-19","frequency":30}, ..., {"value":"2015-12-10","frequency":1}]},
{"columnName":"ExternalSystemID","dataType":"int","allowNull":false,"isPrimaryKey":false,"isForeignKey":true,"valueFrequencies":[{"value":"111","frequency":2},
... ... , {"value":"10","frequency":41}, {"value":"346","frequency":31},
{"value":"3287","frequency":13}]},
```

These examples show that the JSON file saves the information of all the constraints, including the statistics of original data set 10. For each column, every value may be recorded with its frequency, recorded in a structure called "valueFrequencies." Therefore, when new data come in, the data statistics recorded in the SAIDMs only need to be updated to decide if different test values need to be selected from the perspective of statistics. The StudyActive and Deleted columns have only "1s" and "0s." Summing the frequencies of the original data shows that the original Studies table has 1710+2171=3881 rows.

This is the end of the data and constraint collection and analysis—all necessary data statistics and constraints have been recorded and constraint information and analytical results have been stored in the JSON files. The next step is to create SAIDMs, and important values from the constraints are used as characteristics of domain partitions. For each column, important test values from the constraints are collected. Note that test values do not need to be collected from every constraint because some constraints, such as foreign key constraints, are not applicable. Important test values are collected from check constraints, default constraints, specific value constraints, logic constraints, and statistics-based constraints. Taking the ExternalSystemID column as an example, this column has many values from original data set 10. If the most and least counted values are selected, the value 111 with frequency 2 and the value 10 with frequency 41 are selected. Since there are no check, default, or specific value constraints specified for this column, the system generates 0, the min integer, and the max integer values as edge cases:

{"value":"$2^{31}-1$","frequency":-1}, {"value":"$-2^{31}$","frequency":-1}, {"value":"0","frequency":-1}

The frequency is −1, meaning that these values are not from original data set 10 but were added by the system. Therefore, the SAIDM for the ExternalSystemID column is finished. From the integer domain of this column, five values are selected: $2^{31}-1$, $-2^{31}$, 0, 10, and 111.

Similarly, SAIDMs may be created and test values derived for the other columns. For the ProjectID column, $[-2^{31}, 20, 0, 2, 2^{31}-1]$ can be derived. For the StudyActive column, [0, 1] can be derived. For the Delete column, [0, 1] can be derived. For the Created and Updated columns, [2010-01-09, 2011-01-19, " ", null] and [2014-12-12, 2015-12-10, " ", null], can be derived respectively. The Created and Updated columns have " " and nulls because they are the edge case values for the two columns.

If there are new data or constraints, the new data and constraints just need to be analyzed against the existing data statistics and analytical results of the constraints of the SAIDMs to determine whether new data need to be selected for the SAIDMs.

The last step is to generate an effective test data set from the SAIDMs. The first constraint to consider is a foreign key constraint. Test values that have been generated for the referred column of the referred table should be selected. For example, the Studies table has a foreign key constraint ProjectID, which refers to the ProjectID column of the Projects table. Test values are generated for the Projects table then for the Studies table. Thus, when test values are generated for the ProjectID column of the Studies table, values that existed in the ProjectID column of the ProjectID table have to be used; otherwise, the foreign key constraint will be violated.

The density constraint referred to above specifies that the number of parent instances is −1, which means that studies need to be generated for every project. If four projects (IDs are 58, 54, 214783647, and 48) have been generated for the ProjectID column of the Studies table, no more than five studies should be generated for each projectID. Since the system uses random generation, the actual number of studies that belong to the four projects could be between 5 and 20. In one generated, effective test data set, there could be eight actual studies—the project with ID 58 having five studies, and the rest (three projects) having one study each.

When generating effective test data sets, logic constraints have to be satisfied. Based on the specified constraint, there must be at least one study such that its ID is equal to 1. This study is active and not deleted, and has active users. Other rows may or may not satisfy the logic expression. The "rowNumberToGenerate" attribute shows −1, meaning that there is no specific test data set size constraint. For other rows and columns that do not have any constraints, the system selects test values randomly from the SAIDMs. In such a way, the system generates an effective test data set to satisfy all specified constraints.

Below is an example showing how to generate an effective test data set from the SAIDM of the Studies table. The SAIDM of the Studies table saves the statistical distribution of the Studies table in the original data source and constraints. SAIDMs and derived test values have been created for each column input as discussed above. When the each choice combinatorial coverage criterion is specified for the ProjectID, StudyActive, Deleted, Created, Updated, and External System ID columns, as shown previously, a test data set can be generated that has five rows. Each value from a block for each column input appears at least once in the test data set. In the original data source, the Studies table has 3881 rows, but the test data set has only five rows, showing the reduction in the data size.

Next, test data may be generated when there are changes. For example, the statistics-based constraint changes and it extracts only the least counted values, as opposed to extracting both the most and least counted values in a prior cycle. Since the analytical results of the Studies table are available, the original data source does not need to be re-processed. The least counted values are extracted from the saved statistical distribution. When the new constraint is used to create SAIDMs and derive test values for the columns, the least counted test values will not be included. For the ProjectID column, $[-2^{31}, 0, 2, 2^{31}-1]$ can be derived. For the StudyActive column, [1] can be derived. For the Delete column, [0] can be derived. For the Created and Updated columns, [2011-01-19, " ", null] and [2015-12-10, " ", null] can be derived respectively. When the each choice combinatorial coverage criterion is used, there are only four rows in a new test data set.

Figure 3B:
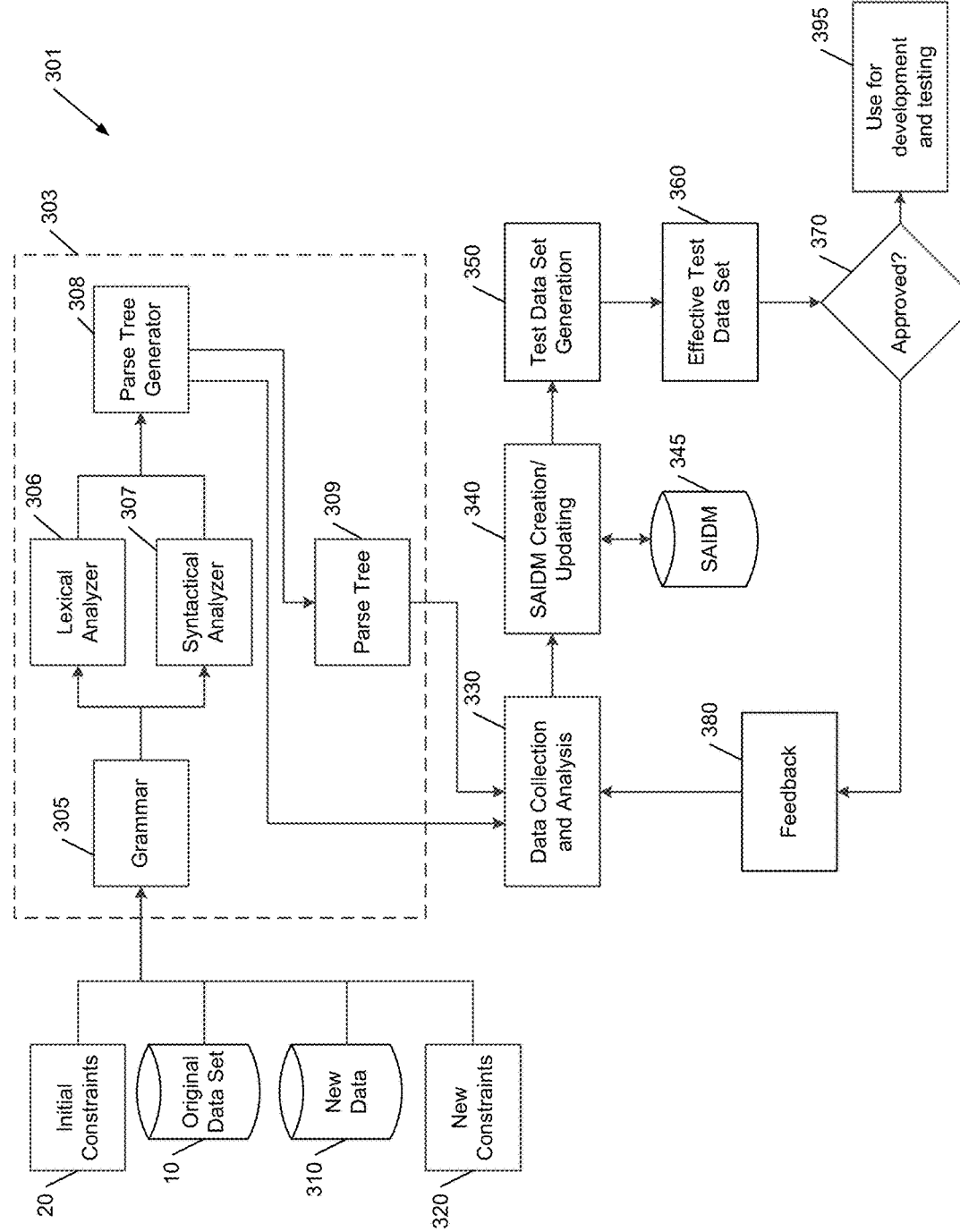
FIG. 3B is a block diagram as in FIG. 3A with a Grammar Module, according to an embodiment of the present invention.

The examples shown in FIGS. 3A and 4 use database data. This test data set generation approach is generic so that testers can use it for generating other types of data. FIG. 3B shows how to generate effective test data sets when a grammar is needed to parse text files such as a JSON structure, according to an embodiment of the present invention.

Original data set 10 may be stored in JSON files or another format. One JSON structure is called "audit data," which record how database data are changed in different aspects, such as which row is changed, what type of change it is (create a new row, update an existing row, or delete an existing row), and when the row is changed. Audit data may comprise JSON-like flat files, and may record changes to a database cell associated with various projects. The audit data may have many attributes that may describe these changes. Accordingly, audit data are stable across different projects, and may remove dependencies from using different types of databases.

An audit record may have several attributes (other attributes are possible, but these four attributes demonstrate how complex the structure is):

uuid—Unique identifier for the audit.
what_uri—A URI (uniform resource identifier) identifies the entity (table) that has changed; this entity is a single object whose UUID is a part of what_uri. For ease of fetching audits for an entity, an entity's URI will not change during that entity's lifetime.
which_changed—A collection of key-value pairs listing the attributes and attribute values changed in this audit. The type of change (e.g., "create"|"update"|"delete") is also provided. See below for an example.
when_audited—The time that the audit occurred on the client side; typically precise to the millisecond.

These attributes may comprise input parameters for an input-domain-based technique. For example, these attributes may be represented with the following values:

```
{
    "uuid" : "d15d75c2-88d7-11e1-9de6-00261824db2f",
    "what_uri" :
    "com:mdsol:studies:ea25c8f2-8350-11e1-b36b-00261824db2f",
    "which_changed" : {
        "type" : "update", // Note: "type" can be one of "create" |
        "update" | "delete" "changes" : [
            {"field" : "name", "oldValue" : "Study1",
            "newValue" : "SuperStudy1"},
            {"field" : "address", "oldValue" : "123 My Way",
            "newValue" : null},
            {"field" : "sponsor", "oldValue" : null, "newValue" :
            "BigPharma"}
        ]
    },
    "when_audited" : "2017-05-05T14:31:22.013Z",
}
```

For this audit data example, a row (represented by a uuid "ea25c8f2-8350-11e1-b36b-00261824db2f") in the Studies table is updated. The old value "Study1" of the "name" column is updated to "SuperStudy1." The old value "123 My Way" of the "address" column is updated to null. The old value null of the "sponsor" column is updated to "BigPharma." Accordingly, a data entry may have nested structures, and a grammar may be used to analyze the structure and test values.

If data are in a special JSON format such as audit data, a user may need to write a grammar to understand the structure. A grammar module 303 may be needed to parse the special JSON format. A grammar describes the syntax and semantics of the structure of a data set and may include constraints and coverage criteria for generating test data. Grammar 305 may be written in ANTLR language (ANother Tool for Language Recognition, http://www.antlr.org/). A grammar includes two parts: a lexer and a parser. A lexer is used to define keywords or tokens. A lexer grammar is shown below:

```
lexer grammar auditLexer;
WHENAUDITED: '"when_audited"' ;
STRING : '"' (ESC | ~["\\])* '"' ;
COLON: ':' ;
```

The first line shows that the lexer grammar's name is "auditLexer." Below that, each line defines a token (called a keyword or identifier): "when_audited" is identified as a WHENAUDITED token, and other strings are identified as STRING tokens. This means that when the grammar parses a JSON file that includes "when_audited," this string is not treated as a normal string value, but a WHENAUDITED token. COLON is also defined.

A parser example is shown below:

```
parser grammar auditParser;
options {tokenVocab=auditLexer;}
maudit : entry+;
entry : '{' uuid COMMA whatUri COMMA whenAudited COMMA
whichChanged '}';
//@terminal
whenAudited : '"when_audited"' COLON STRING;
```

The first line shows that the parser grammar's name is "auditParser." The second line shows that this parser grammar uses a lexer named "auditLexer." The third line shows that an audit (the root structure in a JSON file) could have one entry or more. The "+" symbol means at least one. The next line shows that an entry could have multiple attributes such as uuid, whatUri, whenAudited, and whichChanged, connected by COMMA and surrounded by braces. Furthermore, each higher attribute has lower attributes. For example, whenAudited consists of a WHENAUDITED token, a COLON, and a STRING value. Each element in a line at the left side of ":" is called a non-terminal because it may have more attributes. An annotation may be added to show when to stop looking for lower level attributes by having "@terminal." The example shows that a level lower than the level of whenAudited will not be processed. That means the WHENAUDITED token, COLON, and STRING value are terminals and they do not have child attributes.

Figure 5:
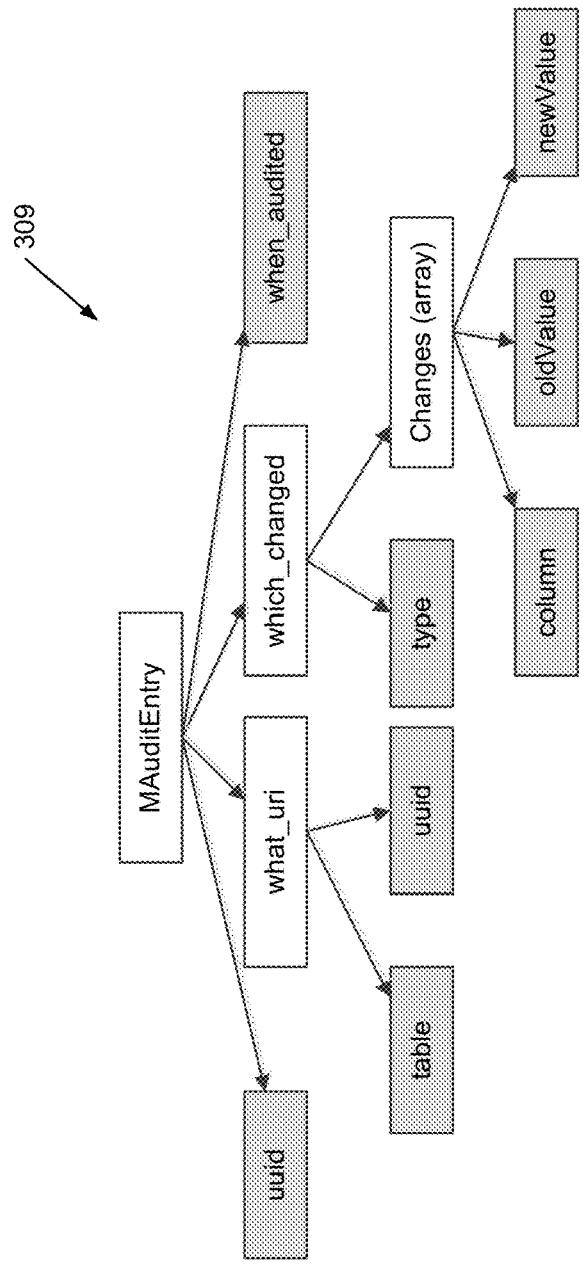
FIG. 5 is a schematic diagram of a parse tree, according to an embodiment of the present invention.

Grammar module 303 may use a grammar to parse and analyze original data set 10 and may also generate parse tree 309, which may include information about the constraints and combinatorial coverage criteria, which may be rules used generate test data. An example of a parse tree is shown in FIG. 5. In computer science, a tree is a data structure, made up of nodes and edges. A tree does not have cycles and usually has one root, which is the top node in the tree. Every entry (audit record) can be mapped to this parse tree since all the entries have the same data structure. The root of the tree is the entry itself. Each entry may have more attributes, but in the simplified example of FIG. 5, only four attributes are shown under the root—uuid, what_uri, which_changed, and when_audited. These four attributes are called children of the root. Furthermore, what_uri has two children: table and uuid. which_changed has two children, type and changes; changes has three children. If a node does not have any children, this node is called a leaf. Leaves are colored gray in parse tree 309 in FIG. 5.

FIG. 3B shows grammar module 303 in more detail. Grammar module 303 may include lexical analyzer 306, syntactical analyzer 307, and parse tree generator 308. The structure of original data set 10 may be complex. Accordingly, in order to generate a meaningful, effective test data set 360 that satisfies complex constraints, system 301 may write grammar 305 to understand the data structure and relationships among the data attributes. Data collection and analysis module 330 may then analyze the original dataset against the defined grammar 305 and may collect all possible values of each attribute of original data set 10.

Grammar 305 may be parsed by lexical analyzer 306 and syntactical analyzer 307. Lexical analyzer 306 may recognize values from original data set 10 as keywords and tokens based on the grammar. Syntactical analyzer 307 may extract data structure information, attributes relationships, and constraints and may process this information. Parse tree generator 308 may gather information from lexical analyzer 306 and syntactical analyzer 307 to generate an initial parse tree 309. Each node of parse tree 309 may represent an attribute of the structure of original data set 10. A leaf, which does not have children, of this parse tree may be a terminal node. A terminal node is one whose attribute (node) has been annotated in the grammar and does not need to be parsed further semantically, even though it may have more sub-structures syntactically. A data statistical distribution and specified constraints, along with the parse tree 309, are passed to data collection and analysis module 330 from parse tree generator 308.

An example illustrates these techniques. Assume there are 21,463 rows of records that reflect how data are changed. Input domain models are created for every input attribute. To decide which test values to use, data are collected from the original data set and analyzed. For instance, there are two attributes—table and type. The numbers of appearances of distinct test values for the attribute "table" are:

--- subjects: 1375 (this means the "subjects" table appears 1375 times in the 21,463 entries)
article_types: 105
strata_factor_state_caps: 167
simulation_setups: 2
inventory_items: 2547
shipment_inventory_items: 3204
randomization_list_generators: 3
dosing_factors: 6
country_caps: 30
study_design_histories: 19
inventory_tiers: 1

---

Assume there are 58 distinct tables in the 21,463 entries, so data for only some of the tables are shown here. If the characteristic to create an input domain model for this attribute is "select the two most counted and the two least counted tables," the input domain model will include four tables for this attribute:

--- inventory_tiers
simulation_setups
inventory_items
shipment_inventory_items

---

In another example, the number of appearances of another attribute "type" are shown below:

---

"update" : 10,224
"create" : 10,907
"delete" : 332

---

Note that the total of the three different types equals the total of all the entries—21,463—which means each entry has a type of change. If the same characteristic that is used for the "table" attribute is used for the "type" attribute (e.g., select the two most and two least counted tables), all of the three types in the input domain model will be used for this attribute because the characteristic requires four values and there are only three types.

Furthermore, after analyzing the types used in 21,463 entries, it may be determined that only "update" and "create" are used, but "delete" is not used in any entry. Then, it is possible to say that the final effective test data set has more coverage because "delete" is included in the input domain model and effective test data set. If each table included in the input domain model has to have three change types, the effective test data set has at least 4*3=12 entries.

Similarly, input domain models for other attributes such as columns, oldValue, and newValue may be generated. When collecting values for columns oldValue and newValue, all column values cannot be collected from all tables, since each table has different columns, and column1 that belongs to table A cannot be used for table B. So, when collecting values from the original data set, it must be determined which columns belongs to which tables. This is a determination constraint, which is described below.

For this example, test data are generated by considering the table, type, column, and oldValue and newValue fields. So far, four tables and three types of change have been selected. Likewise, based on the statistics, four values (two most and least counted values) for columns for each table are also selected. Then test values for the oldValue and newValue fields are selected based on the selected tables and columns. For two tables, two values (only two values are available) are selected for every column and for the other two tables three values (only three values are available) are selected. Therefore, the combinations are 2 (two tables)*3 (three types of change)*4 (four columns)*2 (two values)+2 (two tables)*3 (three types of change)*4 (four columns)*3 (three values)=120. The data set is thus reduced to 120.

After analyzing the collected test values and constraints (e.g., in data and collection analysis module 330, the input domain models for every attribute may be generated and merged to produce parse tree 309. Effective test data set 360 may be generated from the parse tree, which may be used and evaluated through agile software development cycles. Machine-learning techniques may be used to improve the input domain models based on feedback from project managers, architects, developers, and testers. For example, in operation 370, if effective test data set 360 is approved, it may be used for development and testing in operation 395. However, if effective test data set 360 is not approved, the generated input domain models may be improved based on feedback 380.

The benefits of the present invention include using real data from original data sources instead of generating synthetic data, using input space partition testing in the big data context, developing a novel self-adaptive test generation approach for generating an effective test data set, driving all necessary constraints for testing ETL applications and developing JSON formats to specify each constraint, and implementing a self-adaptive, big data test data set generator. The test data sets generated by the present invention are effective because they are smaller than the original data sets and include values that satisfy a sufficient number of constraints, and the satisfied constraints are strong enough for testing purposes.

Input space partition testing may be used as a basis for generating an effective test data set and then the self-adaptive big data test data set generation approach is developed. This approach generates a small and effective test data set from an original data set to satisfy various constraints. This big data test data set generation approach generates test data sets quickly and automatically when new data are input and the constraints are updated. Using the small and effective data sets generated from this approach does not hinder continuous integration and delivery when developing and testing big data applications in agile development processes. Using such test data sets in testing environments reduces the testing time from days and weeks to hours.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

Referring back to the block diagrams in FIGS. 3A and 3B of systems for generating effective test data sets, the systems may include a processor and have an internal or external memory for storing data and programs. A general-purpose computer may include a central processing unit (CPU) for executing instructions in response to commands and a communication device for sending and receiving data.

In one embodiment, the original data set 10 may be transmitted over a network, which may include a communications interface that allows software and data to be transferred between client device, processor, the other system components, and the external systems. In this specification, the terms "computer program medium" and "computer readable medium" are generally used to refer to media such as a removable storage device, a disk capable of installation in a disk drive, and signals on a channel. These computer program products may provide software or program instructions to a computer system.

Computer programs that may be associated with applications of the system for generating effective test data sets for testing big data sets may be stored in the main memory or secondary memory. Such computer programs may also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In one embodiment, the computer-based methods may be accessed or implemented over the World Wide Web by providing access via a Web Page to the methods described herein. Accordingly, the Web Page may be identified by a URL. The URL may denote both a server and a particular file or page on the server. In this embodiment, it is envisioned that a client computer system may interact with a browser to select a particular URL, which in turn may cause the browser to send a request for that URL or page to the server identified in the URL. Typically, the server may respond to the request by retrieving the requested page and transmitting the data for that page back to the requesting client computer system (the client/server interaction may be typically performed in accordance with the hypertext transport protocol or HTTP). The selected page may then be displayed to the user on the client's display screen. The client may then cause the server containing a computer program to launch an application, for example, to perform an analysis according to the described techniques. In another implementation, the server may download an application to be run on the client to perform an analysis according to the described techniques.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A system comprising:
a data collector for collecting initial constraints and a high volume of data from an original data set, wherein the initial constraints comprise one or more of statistical-based constraints, foreign key constraints, logic constraints, and density constraints;
a data analyzer, including a processor, for analyzing the high volume of data and the initial constraints to generate analytical results;
an input domain modeler for generating an input domain model by finding at least one input domain, dividing each input domain into blocks, and applying combinatorial coverage criteria to the blocks;
a self-adaptive input domain modeler for generating a self-adaptive input domain model by combining the input domain model and the analytical results; and
a test data set generator for generating an initial test data set based on the self-adaptive input domain model, wherein:
the initial test data set is reviewed to determine how effective the test data set is, the effectiveness of the initial test data set being measured based on the number of initial constraints satisfied by the test data set and the strength of the satisfied initial constraints;
if the initial test data set is not effective enough, the self-adaptive input domain modeler applies a machine-learning technique to adjust the self-adaptive input domain model based on feedback from at least one reviewer and updates the self-adaptive input domain model based on new data or constraints; and
the test data set generator generates a subsequent test data set based on the updated self-adaptive input domain model.

2. The system of claim 1, wherein the analytical results comprise relationships among objects and a statistical distribution of the data.

3. The system of claim 2, wherein the input domain model is based on the object relationships and statistical distribution.

4. The system of claim 1, wherein if the subsequent test data set is not effective enough, the self-adaptive input domain modeler applies a machine-learning technique to adjust the self-adaptive input domain model based on feedback from at least one reviewer.

5. The system of claim 1, wherein the initial constraints are specified in a JSON format.

6. A computer-implemented method comprising:
collecting initial constraints and a high volume of data from an original data set, wherein the initial constraints comprise one or more of statistical-based constraints, foreign key constraints, logic constraints, and density constraints;
analyzing, using a processor, the high volume of data and the initial constraints to generate analytical results;

generating an input domain model by finding at least one input domain, dividing each input domain into blocks, and applying combinatorial coverage criteria to the blocks;

generating a self-adaptive input domain model by combining the input domain model and the analytical results;

generating an initial test data set based on the self-adaptive input domain model;

reviewing the initial effective test data set to determine how effective the test data set is, wherein the effectiveness of the initial test data set is measured based on the number of initial constraints satisfied by the test data set and the strength of the satisfied initial constraints; and if the initial test data set is not effective enough,
  applying a machine-learning technique to adjust the self-adaptive input domain model based on feedback from at least one reviewer;

updating the self-adaptive input domain model based on new data or constraints; and generating a subsequent test data set based on the updated self-adaptive input domain model.

7. The method of claim 6, wherein the analytical results comprise relationships among objects and a statistical distribution of the data.

8. The method of claim 7, wherein the input domain model is based on the object relationships and statistical distribution.

9. The method of claim 6, wherein if the subsequent test data set is not effective enough, applying a machine-learning technique to adjust the self-adaptive input domain model based on feedback from at least one reviewer.

10. The method of claim 6, wherein the initial constraints are specified in a JSON format.

* * * * *